(12) United States Patent
Carcouet et al.

(10) Patent No.: US 10,214,108 B2
(45) Date of Patent: Feb. 26, 2019

(54) DC VOLTAGE SOURCE INCLUDING ELECTROCHEMICAL CELLS HAVING AN ADAPTIVE VOLTAGE LEVEL

(71) Applicant: Commissariat à l'énergie atomique et aux énergies alternatives, Paris (FR)

(72) Inventors: Sebastien Carcouet, Vif (FR); Daniel Chatroux, Teche (FR); Matthieu Desbois-Renaudin, Villard de Lans (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 948 days.

(21) Appl. No.: 14/358,908

(22) PCT Filed: Nov. 14, 2012

(86) PCT No.: PCT/EP2012/072607
§ 371 (c)(1),
(2) Date: May 16, 2014

(87) PCT Pub. No.: WO2013/072362
PCT Pub. Date: May 23, 2013

(65) Prior Publication Data
US 2014/0300194 A1 Oct. 9, 2014

(30) Foreign Application Priority Data
Nov. 17, 2011 (FR) .................................. 11 60461

(51) Int. Cl.
*H02J 1/00* (2006.01)
*H02J 3/00* (2006.01)
(Continued)

(52) U.S. Cl.
CPC ............ *B60L 3/0046* (2013.01); *B60L 3/003* (2013.01); *B60L 3/04* (2013.01); *B60L 11/14* (2013.01);
(Continued)

(58) Field of Classification Search
CPC .......... H02J 7/0014; H02M 2001/007; H02M 2001/0077; B60L 3/04; B60L 11/1864;
(Continued)

(56) References Cited

U.S. PATENT DOCUMENTS

| | | | | |
|---|---|---|---|---|
| 5,525,891 A | * | 6/1996 | Meyer | H02J 7/1423 320/116 |
| 5,796,175 A | * | 8/1998 | Itoh | B60L 3/0023 307/10.1 |
| 6,178,101 B1 | * | 1/2001 | Shires | H02M 1/4208 323/225 |
| 6,373,226 B1 | * | 4/2002 | Itou | H01M 10/441 320/132 |
| 2003/0042880 A1 | * | 3/2003 | Kataoka | H02M 3/1582 323/282 |

(Continued)

FOREIGN PATENT DOCUMENTS

| | | |
|---|---|---|
| DE | 102009028977 | 3/2011 |
| EP | 2053717 | 4/2009 |

(Continued)

*Primary Examiner* — Rexford Barnie
*Assistant Examiner* — Rasem Mourad
(74) *Attorney, Agent, or Firm* — Occhiuti & Rohlicek LLP (57) ABSTRACT

A DC voltage power source, comprising: first electrochemical cells electrically connected in series; a DC/DC converter, the output of the converter being connected in series with said first electrochemical cells, a secondary DC voltage source applying its potential difference to the input of the converter.

18 Claims, 5 Drawing Sheets

(51) Int. Cl.
*B60L 3/00* (2006.01)
*H02J 7/00* (2006.01)
*B60L 3/04* (2006.01)
*B60L 11/14* (2006.01)
*B60L 11/18* (2006.01)

(52) U.S. Cl.
CPC ......... *B60L 11/1864* (2013.01); *H02J 7/0014* (2013.01); *B60L 2200/36* (2013.01); *B60L 2210/10* (2013.01); *B60L 2210/40* (2013.01); *B60L 2240/36* (2013.01); *Y02T 10/70* (2013.01); *Y02T 10/7011* (2013.01); *Y02T 10/7055* (2013.01); *Y02T 10/7061* (2013.01); *Y02T 10/7077* (2013.01); *Y02T 10/7216* (2013.01); *Y02T 10/7241* (2013.01); *Y10T 307/685* (2015.04)

(58) Field of Classification Search
CPC .... B60L 3/0046; B60L 3/003; B60L 11/1868; B60L 2210/10; Y02T 10/7216; Y02T 10/7077; Y02T 10/7055; Y02T 307/10
See application file for complete search history.

(56) References Cited

U.S. PATENT DOCUMENTS

| | | | |
|---|---|---|---|
| 2006/0097577 A1* | 5/2006 | Kato | F02N 11/0866 307/10.1 |
| 2009/0102422 A1* | 4/2009 | Naganuma | B60L 11/1861 320/118 |
| 2010/0091530 A1 | 4/2010 | Yoshida et al. | |
| 2010/0142228 A1* | 6/2010 | Yamauchi | B60L 11/1868 363/17 |
| 2010/0321070 A1* | 12/2010 | Matsumoto | H03K 17/063 327/109 |
| 2011/0227340 A1* | 9/2011 | Rozman | H02P 27/04 290/31 |
| 2012/0217943 A1* | 8/2012 | Haddad | H02M 3/158 323/282 |
| 2012/0326671 A1* | 12/2012 | Krause | H01M 10/44 320/126 |

FOREIGN PATENT DOCUMENTS

| WO | WO2008/041666 | 10/2007 |
|---|---|---|
| WO | WO 2011/114247 | 9/2011 |

* cited by examiner

DC VOLTAGE SOURCE INCLUDING ELECTROCHEMICAL CELLS HAVING AN ADAPTIVE VOLTAGE LEVEL

RELATED APPLICATIONS

Under 35 USC 371, this application is the national stage of PCT/EP2012/072607, filed on Nov. 14, 2012, which claims the benefit of the Nov. 17, 2011 filing date of French application FR1160461, the contents of which are herein incorporated by reference.

FIELD OF INVENTION

The invention relates to DC voltage sources of high power, specifically DC voltage sources incorporating electrochemical cells. High-capacity voltage sources of this type are specifically electrochemical accumulator batteries or fuel cells. These may be used, for example, in the field of electric and hybrid propulsion, or in on-board power systems.

BACKGROUND

Hybrid internal combustion/electric vehicles or electric vehicles specifically incorporate high-capacity batteries. Likewise, fuel cell-powered vehicles incorporate high-capacity fuel cells. Voltage sources of this type are used to drive an alternating current electric motor via an inverter. The requisite voltage levels for motors of this type are of the order of several hundred volts, typically of the order of 400 volts.

In order to achieve high power and capacity ratings, a number of groups of accumulators are arranged in series. The number of stages (number of groups of accumulators) and the number of accumulators arranged in parallel in each stage will vary as a function of the voltage, current and capacity required for the battery. The combination of a number of accumulators is called an accumulator battery. Electrochemical accumulators used for vehicles of this type are generally of the lithium-ion type, because of their high energy storage capacity, with limited weight and volume. Lithium-ion/iron phosphate ($LiFePO_4$) battery technologies are undergoing substantial developments in the interests of the achievement of a high level of intrinsic safety, at the expense of a slightly reduced energy storage density. An electrochemical accumulator generally has a rated voltage of the following order of magnitude:
  3.3 V, in the case of lithium-ion/iron phosphate technology ($LiFePO_4$),
  4.2 V, in the case of cobalt oxide-based lithium ion technology.

High-capacity fuel cells are also envisaged as DC voltage sources for private motor vehicles or public transport vehicles. A fuel cell is an electrochemical device which converts chemical energy directly into electrical energy. The fuel used in a fuel cell is dihydrogen. Dihydrogen is oxidized on one electrode of the cell, and atmospheric dioxygen is reduced on a further electrode of the cell. The resulting chemical reaction produces water. The major advantage of the fuel cell is the avoidance of the generation of any harmful substances at the site of electricity generation.

A fuel cell is comprised of a stack of multiple cells, arranged in series. Each cell generates a voltage of the order of 1 volt, and the stacking thereof permits the generation of a supply voltage of a higher level, for example of the order of one hundred or several hundred volts.

Figure 1:
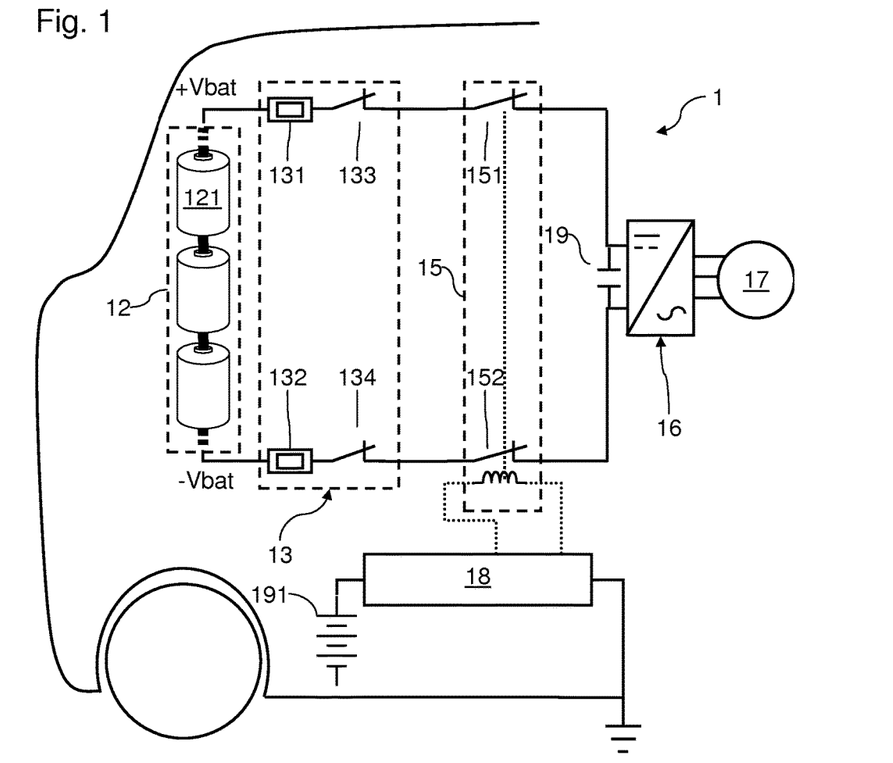
FIG. 1 shows a schematic representation of an example of an electric motor vehicle which is powered by a battery, in accordance with the prior art.

FIG. 1 illustrates an example of vehicle 1 according to the prior art, incorporating a power battery 12. The battery 12 incorporates electrochemical accumulators 121 connected in series, for example between 40 and 150 accumulators, depending upon the voltage required and the type of accumulators used. The battery 12 applies a voltage +Vbat to a first terminal, and a voltage −Vbat to a second terminal. The accumulators 121 are connected in series by means of electrical power connections. The terminals of the battery 12 are connected to a DC interface of an inverter 16. An electric motor 17 is connected to an AC interface of the inverter 16.

The connection between the terminals of the battery 12 and the DC interface of the inverter 16 is formed by a protection circuit 13 and a power coupling circuit 15. The protection circuit 13 comprises the fuses 131 and 132, which are configured for the opening of the connection in the case of a short-circuit. The protection circuit 13 also comprises the disconnectors 133 and 134, which permit the disconnection of the battery 12, thereby ensuring, in a secure and visually confirmable manner, that the battery is in a safe condition in order to conduct operations on the vehicle 1.

A power coupling circuit 15 comprises switches 151 and 152, which permit the selective connection/disconnection of the terminals of the battery 12 to the DC interface of the inverter 16. The opening/closing of the switches 151 and 152 is controlled by a command circuit 18, which is configured in the form of a computer for the monitoring of the operation of the battery 12. The command circuit 18 will only close the switches 151 and 152 when the vehicle is ready for start-up. The switches 151 and 152 may be used to interrupt the power supply to the motor 17 in case of faults. The command circuit 18 is typically powered by a supply battery 191 supplying the on-board system of the vehicle 1, the voltage rating of which is substantially lower than that of the battery 12.

A DC/DC converter, not illustrated, converts the voltage of the battery 12 to the voltage of the on-board system of the vehicle 1, which is generally close to 12 V.

The inverter 16 incorporates 6 transistors of the IGBT type, forming 3 switching arms, and the motor 17 is directly supplied by this inverter 16. A decoupling capacitor 19, rated to a few hundred microfarads, is arranged in parallel with the inverter 16. This capacitor 19 is used for the decoupling of the voltage, in order to minimize fluctuations in the supply voltage associated with the rapid switching of IGBTs upon closing and opening.

The energy stored in the capacitor 19 is: $\frac{1}{2}CU^2$. Accordingly, it is not possible to proceed with the direct closing of the contactors 151 and 152 on the inverter 16, as this will generate an overcurrent of several thousand amperes as a result of the presence of the capacitor 19, initially in the discharged state. An overcurrent of this magnitude might induce a hazardous overvoltage for equipment, as a result of the overvoltage generated on the capacitor 19 and on the IGBTs of the inverter 19 by the stray inductance of cabling.

The vehicle 1 therefore incorporates a precharge system for the limitation of the charging current of the capacitor 19, whereby the contactors 151 and 152 will not close until the capacitor 19 is charged. The contactor 152 is closed in the first instance, with no current flowing. The precharge system is arranged in parallel to the contactor 151, and is comprised of a resistor and a contactor. The resistor, for example a vitrified coiled precharge resistor or a wire wound resistance, will be subject to a sudden load increase upon charging of the capacitor. This resistor must be capable of storing thermal energy lost in the form of heat, and of dissipating this energy.

In practice, the battery 12 will be subject to variations in voltage during discharging. Moreover, the failure of an accumulator in the battery 12 will entail the necessity for the decoupling thereof from the inverter 16, with the consequent shutdown of the vehicle 1, which will thus be rendered inoperable.

The vehicle marketed by the company Toyota under the brand name "Prius" incorporates a step-up/step-down voltage converter which applies a stabilized voltage to the input of the inverter, generated from the fluctuating voltage delivered by the power battery. The converter operates in step-up mode when the power battery is supplying the inverter, and in step-down mode when the electric motor is operating as a generator. In this vehicle, the power battery is only used for periods of relatively brief duration, controlled by a computer, as the combustion engine fitted to the vehicle accounts for the greater proportion of the operating cycle. Accordingly, the computer can control both the intervals and the duration of phases for the operation of the converter. Such a converter has thus high cooling requirements and, in consequence, the associated cost thereof, are relatively modest as a result.

The adoption of a converter of this type in a vehicle provided with an electric motor, but with no combustion engine, is problematic. In practice, in a vehicle of this type, the converter will be in service throughout the entire operating cycle of the electric motor. In consequence, particular attention will need to be paid to the effective design of the cooling system for the converter, thereby necessitating a converter which is both cumbersome and expensive, and which may occupy approximately one third of the volume of the power battery, in the light of the power level which is effectively deployed in the battery.

Moreover, in certain applications, the capacity deployed exceed 100 kWh. For example, the following capacities may be deployed in storage batteries: 200 kWh for the propulsion of a bus, between 100 kWh and several MWh for a storage facility associated with a renewable energy generator, and over 100 kWh for a standby storage facility in thermal power plants or IT complexes. Given the dimensions and mass of batteries of this type, the latter are generally comprised of independent modules which are interconnected in series and/or in parallel, thereby facilitating the manufacture and transport thereof. In power batteries of this type, the conduct of maintenance operations by the isolation of one or more modules, whilst maintaining continuity of service, is particularly problematic. The various modules will show different characteristics (associated with differences in their charging status, variations in production, age or wear) and, accordingly, cannot be connected directly together by means of simple contactors. The achievement of an equal level of charging in all modules prior to the connection thereof directly is, at best, a complex operation; at worst, an impossible operation, particularly during the operation of the power battery. In consequence, modules of this type are provided with respective power converters for the adjustment of their output voltage, thereby permitting the interconnection thereof. Converters of this type are particularly expensive, cumbersome and complex. Moreover, converters of this type must incorporate components which are resistant to the high levels of power deployed, resulting in substantial conduction and switching losses, and also restricting the frequency of switching to exceptionally low levels.

SUMMARY

The object of the invention is the resolution of one or more of these disadvantages. The invention relates specifically to a DC voltage power source, as claimed in claim 1. Further characteristics and advantages of the invention will be clarified by the following description thereof, which is provided by way of information and not by way of limitation, with reference to the attached diagrams.

DETAILED DESCRIPTION

The invention proposes a DC voltage power source. This source comprises first electrochemical cells connected in series and a DC/DC converter. A secondary DC voltage source is connected to the input of the converter. The output of the converter is electrically connected in series to said first electrochemical cells.

The invention permits the adaptation of the voltage of a battery module to the voltage of other modules to which it is to be connected in parallel. The invention also permits the adaptation of the voltage at the terminals of a module, with exceptionally limited losses, and the optimization of cost and volume requirements. In practice, even if a converter with a relatively low efficiency of conversion is used, the losses associated with this lower efficiency will only apply to the power generated by the converter, and not to the power of the primary source. For example, a converter of this type with an efficiency rating of 90% for a power rating of 1 kW will show losses of 100 W, whereas a converter with a higher power rating (100 kW) will show 98% efficiency, with losses of 2 kW.

Due to its more modest dimensions, a converter of this type can operate with significantly higher frequencies of switching. In the light of the relatively low levels of voltage present in the converter, the latter may, where applicable, incorporate switches comprised of low-voltage MOS-type transistors, transistors of this type being both low in cost and suitable for high-frequency switching operations, as they are substantially more efficient than high-voltage transistors of the same type. A higher switching frequency also has the advantage of permitting a substantial reduction in the size of passive components, such as inductances and capacitors.

Figure 2:
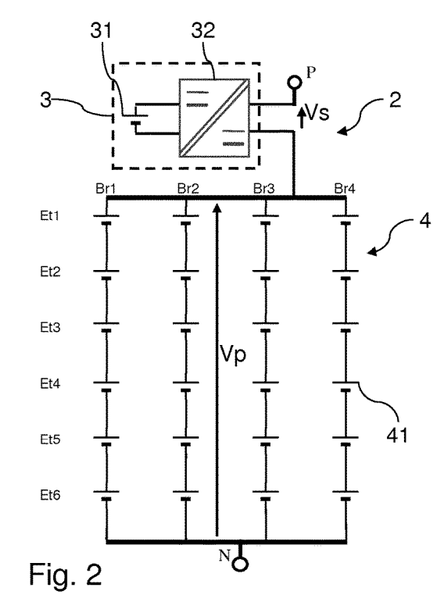
FIG. 2 shows a schematic representation of an example of a DC voltage source according to one form of embodiment of the invention.

FIG. 2 shows a schematic representation of an example of a DC voltage source 2 according to one form of embodiment of the invention. The source 2 thus applies a DC voltage between the terminals P and N. The DC voltage source 2 is comprised, firstly, of a series of electrochemical cells which are electrically connected in series to form a primary source 4, and of a voltage adaptation device 3.

In this case, the primary source 4 is implemented in the form of an electrochemical accumulator battery 41. The battery 4 comprises a number of accumulator stages connected in series, and a number of accumulator branches connected in parallel. In the interests of simplification, the battery 4 illustrated comprises four branches Br1-Br4 connected in parallel, and six stages Et1-Et6 connected in series. The battery 4 may also be comprised of a large number of accumulators 41 connected in series, typically between 40 and 150 accumulators, depending upon the voltage required and the type of accumulators used. The voltage at the terminals of the charged battery 4 is typically of the order of 400 V, e.g. for the supply of power to an electric motor for the propulsion of a vehicle.

At the terminals of the battery 4, power collectors are advantageously connected so as to be run through by the parallel currents originating from the various branches Br1-Br4. The voltage generated at the terminals of the branches Br1-Br4 is identified by Vp.

The voltage adaptation device 3 comprises a secondary DC voltage source 31 and a DC/DC converter 32. In this case, the secondary DC voltage source 31 is an electrochemical accumulator. In a motor vehicle, the electrochemical accumulator may be the battery which supplies the on-board power system of the vehicle, generally with a rated voltage of the order of 12 V or 24 V. The electrochemical accumulator may be of the same type as the electrochemical accumulators 41. The secondary DC voltage source 31 may also incorporate a number of electrochemical accumulators connected in series and/or in parallel. The voltage V31 delivered by the secondary source 31 is applied to the input of the converter 32. The DC/DC converter 32 is configured for the conversion of the voltage V31 applied to its input into a voltage Vs to its output. The converter 32 is configured for the generation of a voltage Vs which is separate from the voltage V31 applied to its input.

The output of the converter 31 is electrically connected in series to the battery 4. The DC voltage V2 delivered by the source 2 between the terminals P and N is therefore defined as follows: V2=Vs+Vp.

The invention therefore permits the adaptation of the output voltage V2 by means of a voltage conversion effected by the converter 32, on the basis of a relatively low input voltage V31. Given the relatively low amplitude of conversion voltage, the converter 32 may employ components of relatively modest dimensions, e.g. for cooling functions thereof, such that a reasonable cost and reasonable dimensions thereof can be achieved. Losses associated with the Joule effect are also reduced, given that only a proportion of the voltage V2 is generated by the converter 32.

The invention will also permit the adaptation of voltage for various DC voltage sources which are to be connected in parallel, even where these different voltage sources show different characteristics (associated with their charging status, variations in production, age or wear).

The voltage at the terminals of the primary source 4 will advantageously be between 4 and 20 times greater than the voltage at the terminals of the secondary source 31. Accordingly, voltage modulation will be completed over a relatively reduced voltage range in relation to the rated voltage of the primary source 4. The invention is particularly advantageous for primary sources 4, the rated voltage of which is higher than 100 V.

Figure 3:
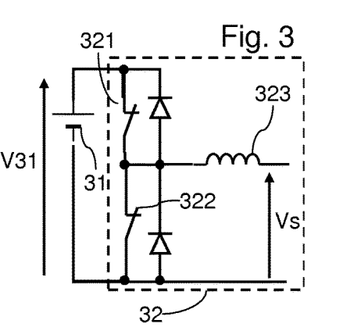
FIG. 3 shows a schematic representation of a first form of embodiment of the converter.

FIG. 3 illustrates a first mode of embodiment of a converter 32. The converter 32 comprises two switches 321 and 322 connected in series and controlled by a command circuit, which is not illustrated. The converter 32 comprises an inductance 323 connected to a connecting node between the switches 321 and 322. The inductance 323 is connected between this connecting node and the output terminal P. The terminals of the accumulator 31 are connected to the connecting node via the switch 321 and the switch 322 respectively. The output voltage Vs is applied between the output terminal P and the anode of the accumulator 31, which is to be connected to the battery 4.

$\alpha$ represents the cyclical closing ratio of the switch 321, defined by the command circuit. The command circuit defines a cyclical closing ratio for the switch 322 of $(1-\alpha)$. In a manner known per se, the command circuit maintains the switch 321 open and the switch 322 simultaneously closed, and vice versa.

With the accumulator 31 in discharge mode (whereby the converter 32 supplies current to an external load), the output voltage Vs is therefore defined as follows:

$Vs=\alpha*V31$

The command circuit may define a setpoint value for the voltage Vs. In this case, the cyclical ratio $\alpha$ is defined as a function of this setpoint value.

The converter 32 therefore functions as a step-down voltage converter with the accumulator 31 in discharge mode, with the current moving from V31 to Vs.

The converter 32 therefore functions as a step-up voltage converter with the accumulator 31 in charging mode, with the current moving from Vs to V31.

Figure 4:
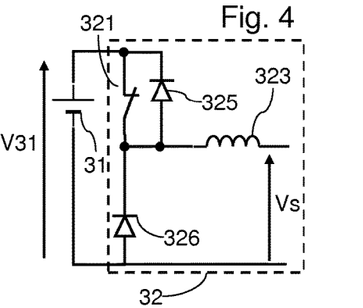
FIG. 4 shows a schematic representation of a second form of embodiment of converters.

FIG. 4 illustrates a second mode of embodiment of a converter 32. The converter 32 comprises an inductance 323, connected between a connecting node and the output terminal P. The switch 321 is connected between the cathode of the accumulator 31 and the connecting node. The switch 321 is controlled by a command circuit, which is not illustrated. A diode 325 is also connected (in parallel to the switch 321) between the cathode of the accumulator 31 and the connecting node. A diode 326 is connected between the anode of the accumulator 31 and the connecting node. The output voltage Vs is applied between the output terminal P and the anode of the accumulator 31, which is to be connected to the battery 4.

This form of embodiment allows the number of switches controlled by the command circuit to be restricted. $\alpha$ represents the cyclical closing ratio of the switch 321, defined by the command circuit.

With the accumulator 31 in discharge mode (whereby the converter 32 supplies current to an external load), the output voltage Vs is therefore defined as follows:

$Vs=\alpha*V31$

The converter 32 therefore functions as a step-down voltage converter with the accumulator 31 in discharge mode.

With the accumulator 31 in charging mode, the output voltage Vs is defined as follows:

$$V_s = V_{31}$$

Advantageously, the freewheeling diode 326 shows a parameter $I^2t$ which is higher than that of any fuse arranged in series with the voltage source 2, such that the former will not be destroyed in the case of a short-circuit.

Where the accumulator 31 is of the same type as the accumulators 41, the connection thereof at the input of the converter 32 will induce levels of charging and discharging which are different from those of the accumulators 41. In practice, the voltage V31 differs from the voltage at the terminals of each of the stages Et1-Et6, given that the cyclical closing ratio α of the switch 321 differs by 1. This load imbalance is not problematic, as the converter 32 is designed such that the voltage V2 will be adapted to the required level.

Figure 5:
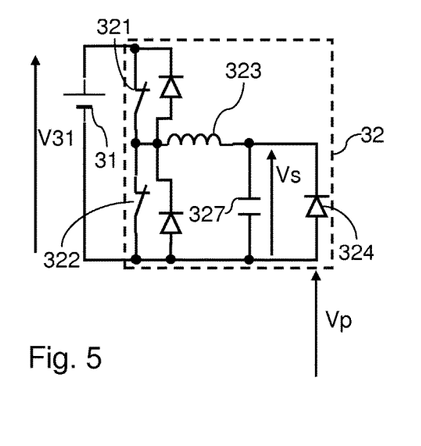
FIG. 5 shows a schematic representation of a third form of embodiment of the converter.

FIG. 5 illustrates a third mode of embodiment of a converter 32. The converter 32 comprises an inductance 323, connected between a connecting node and the output terminal P. The switch 321 is connected between the cathode of the accumulator 31 and the connecting node. The switch 322 is connected between the anode of the accumulator 31 and the connecting node. The switches 321 and 322 are controlled by a command circuit, which is not illustrated. A diode 324 is connected between the output terminal P and the anode of the accumulator 31. A capacitor 327 is advantageously connected in parallel to the diode 324. The capacitor 327 permits filtering of the output voltage Vs. The diode 324 permits the prevention of the occurrence of a strong negative voltage due to the battery 4. The dimensions of the capacitor 327 may therefore be determined exclusively as a function of the output voltage Vs.

The command circuit defines a cyclical closing ratio α for the switch 321. The command circuit defines a cyclical closing ratio for the switch 322 of (1−α). In a manner known per se, the command circuit maintains the switch 321 open and the switch 322 simultaneously closed, and vice versa.

Advantageously, the freewheeling diode 324 shows a parameter $I^2t$ which is higher than that of any fuse arranged in series with the voltage source 2, such that the former will not be destroyed in the case of a short-circuit.

Figure 6:
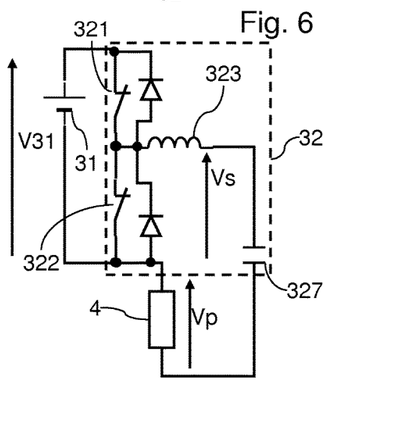
FIG. 6 shows a schematic representation of an example of a DC voltage source, incorporating a converter according to a fourth form of embodiment of the invention.

FIG. 6 illustrates a fourth mode of embodiment of a converter 32. The converter 32 comprises an inductance 323, connected between a connecting node and the output terminal P. The switch 321 is connected between the cathode of the accumulator 31 and the connecting node. The switch 322 is connected between the anode of the accumulator 31 and the connecting node. The switches 321 and 322 are controlled by a command circuit, which is not illustrated. A capacitor 327 is advantageously connected between the output terminals P and N. The capacitor 327 permits filtering of the output voltage V2.

The command circuit defines a cyclical closing ratio α for the switch 321. The command circuit defines a cyclical closing ratio for the switch 322 of (1−α). In a manner known per se, the command circuit maintains the switch 321 open and the switch 322 simultaneously closed, and vice versa.

In the modes of embodiment illustrated in FIGS. 3-6, converters 32 function as step-down voltage converters with the accumulator 31 in discharge mode. Accordingly, in discharge mode, the adaptation of voltage between the DC voltage sources according to the invention and connected in parallel, is achieved by means of a voltage step-down. A converter 32 of this type will be preferred, in order to reduce the loading of the accumulator 31 during a voltage adaptation.

Figure 7:
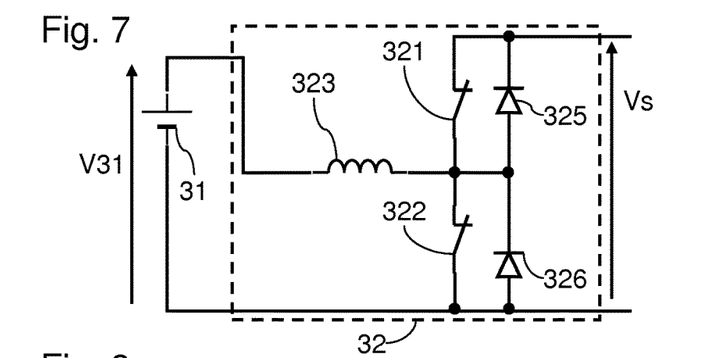
FIG. 7 shows a schematic representation of a fifth form of embodiment of the converter.

FIG. 7 illustrates a fifth mode of embodiment of a converter 32, functioning as a step-up voltage converter with the associated accumulator 31 in discharge mode. The converter 32 comprises an inductance 323 connected between the cathode of the accumulator 31 and a connecting node. The switch 321 is connected between the connecting node and the terminal P. A diode 325 is connected in parallel to the switch 321. The switch 322 is connected between the connecting node and the anode of the accumulator 31. A diode 326 is connected in parallel to the switch 322. The switches 321 and 322 are controlled by a command circuit, which is not illustrated.

The command circuit defines a cyclical closing ratio α for the switch 321. The command circuit defines a cyclical closing ratio for the switch 322 of (1−α). In a manner known per se, the command circuit maintains the switch 321 open and the switch 322 simultaneously closed, and vice versa.

Accordingly, in discharge mode, the adaptation of voltage between DC voltage sources of this type according to the invention, and connected in parallel is achieved by means of a voltage step-up.

Accordingly, in charging mode, the adaptation of voltage between DC voltage sources of this type according to the invention, and connected in parallel is achieved by means of a voltage step-down.

In the modes of embodiment illustrated for the converter 32, the inductance 323 permits the restriction of any current variation in the case of a short-circuit. In order to prevent saturation, the inductance 323 will advantageously be of the air core type.

Figure 8:
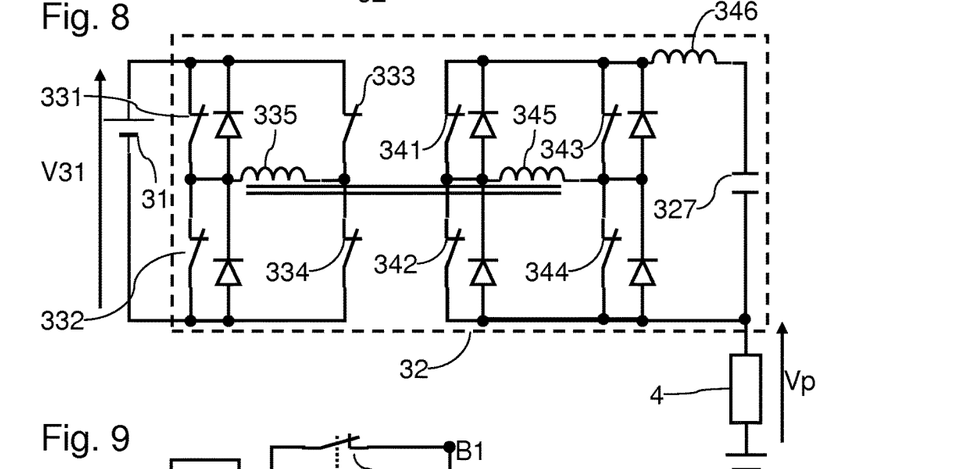
FIG. 8 shows a schematic representation of an example of a DC voltage source according to yet a further form of embodiment of the invention.

Advantageously, the converter 32 incorporates a galvanic isolation transformer. An example of a converter 32 of this type is illustrated in FIG. 8, integrated in a DC voltage source. A transformer of this type is advantageously used for an accumulator 31 formed by the battery of the on-board power system in a motor vehicle. The galvanic isolation transformer comprises a primary side connected to the accumulator 31, and a secondary side connected to the battery 4.

The primary side incorporates an inductance 335 formed of a primary winding, connected between a first connecting node and a second connecting node. A switch 331 is connected between the first connecting node and the cathode of the accumulator 31. A switch 332 is connected between the first connecting node and the anode of the accumulator 31. A switch 333 is connected between the second connecting node and the cathode of the accumulator 31. A switch 334 is connected between the second connecting node and the anode of the accumulator 31.

The secondary side incorporates an inductance 345, formed of a secondary winding, connected between a third connecting node and a fourth connecting node. A switch 341 is connected between the third connecting node and a first terminal of an inductance 346. The second terminal of the inductance 346 is connected to a first electrode of a capacitor 327. A switch 342 is connected between the third connecting node and a second electrode of the capacitor 327. A switch 343 is connected between the fourth connecting node and the first terminal of the inductance 346. A switch 344 is connected between the fourth connecting node and the second electrode of the capacitor 327.

A converter 32 of the boost type may be envisaged, permitting, for example, the achievement of a voltage Vs up to four times greater than the voltage V31. In this case, the inductance 346 is advantageously arranged on the input side, between the cathode of the accumulator 31 and the common point of the switches 331 and 333.

Figure 9:
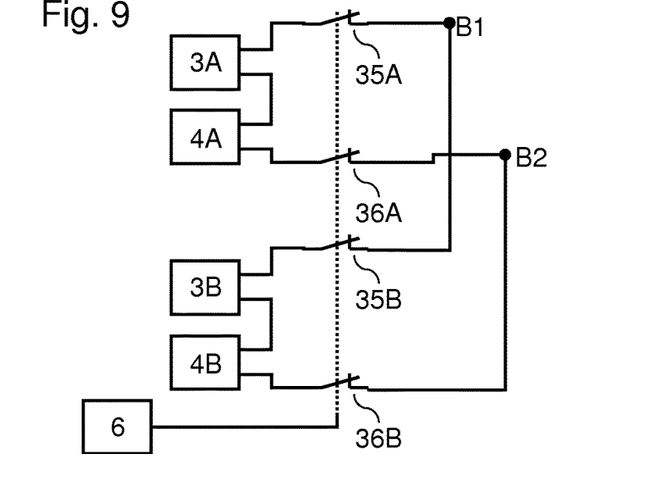
FIG. 9 shows a schematic representation of a system incorporating DC voltage sources according to the invention, connected in parallel.

FIG. 9 shows a schematic representation of a system incorporating DC voltage sources according to the invention, connected in parallel. A first DC voltage source comprises a voltage adaptation device 3A and a battery 4A connected in series. A second DC voltage source comprises a voltage adaptation device 3B and a battery 4B connected in series. The DC voltage sources are connected in parallel at the terminals B1 and B2 by means of the contactors 35A, 36A, 35B and 36B. A monitoring circuit 6 controls the openings/closures of the contactors 35A, 36A, 35B and 36B. The monitoring circuit 6 also delivers voltage setpoints to the first and second voltage sources. The command circuits of the first and second voltage sources control the voltage adaptation devices 3A and 3B, such that the output voltage of the first and second voltage sources corresponds to the voltage setpoints delivered by the monitoring circuit. To this end, the command circuits are provided with a measuring function for the voltage at the terminals of their respective voltage source.

In the examples illustrated, the secondary voltage source 31 is an electrochemical accumulator, and the primary voltage source 4 is an electrochemical accumulator battery. The following options may also be envisaged:
  the primary voltage source incorporates a number of modules connected in series, whereby each module comprises a number of accumulators connected in series;
  the secondary voltage source incorporates at least one module (for example, of the same type as the modules connected in series), comprising a number of accumulators connected in series.

Figures 10, 11, 12:
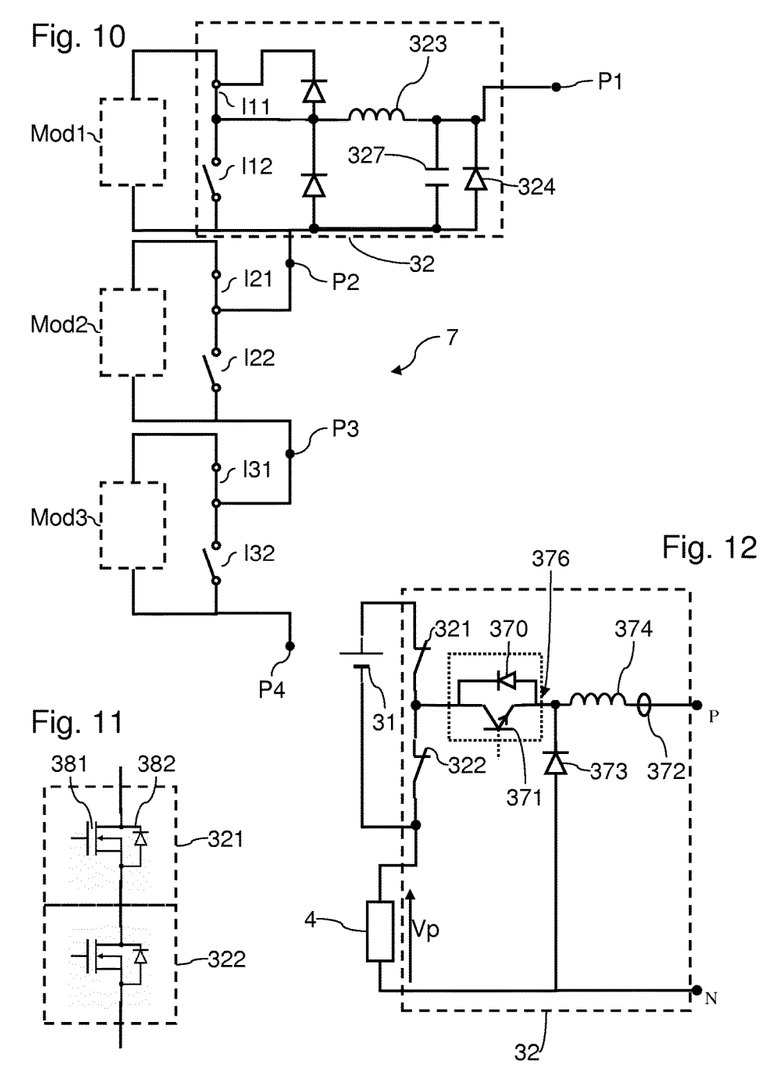
FIG. 10 shows a schematic representation of a further example of a DC voltage source, according to yet a further form of embodiment of the invention.
FIG. 11 shows an example of the structure of the adaptor switches for the output voltage of the converter.
FIG. 12 shows a schematic representation of a further variant of the first form of embodiment of the converter.

In the example shown in FIG. 10, a system 7 comprises a number of modules Mod1, Mod2 and Mod3. Each module comprises a number of accumulators connected in series. The modules Mod2 and Mod3 are connected in series to form a primary voltage source. The module Mod1 is used as a secondary voltage source.

The module Mod2 is connected between the poles P2 and P3, and the module Mod3 is connected between the poles P3 and P4. The system comprises an isolating circuit for each of the modules Mod2 and Mod3, and a regulator 32 for the module Mod1.

Each isolating circuit comprises two branches connected in parallel. A first branch incorporates a switch which is configured to be normally open, arranged in series with a module Mod. A second tap-off branch incorporates a switch which is configured to be normally closed.

Accordingly, the module Mod2 is connected in series with the switch I21 in a first branch between the poles P2 and P3, and a second tap-off branch incorporates the switch I22. The module Mod3 is connected in series with the switch I31 in a first branch between the poles P3 and P4, and a second tap-off branch incorporates the switch I32.

The switches I21 and I31 are configured for the selective opening/closing of the branch incorporating modules Mod2 and Mod3 respectively. The switches I22 and I32 are configured for the selective opening/closing of the tap-off branch. The closure of the switches I21 and I31 is controlled by a command circuit, which is not illustrated. In the absence of a command signal applied by the command circuit, the switches I21 and I31 will be maintained in the open position, for the automatic isolation of modules Mod2 and Mod3 respectively in the case of a malfunction. The closure of the switches I22 and I32 is controlled, by default, by the voltage between the respective terminals of modules Mod2 and Mod3. Accordingly, the normal presence of a voltage between the terminals of modules Mod2 and Mod3 will maintain the switches I22 and I32 in the closed position, thereby ensuring the short-circuiting of modules Mod2 and Mod3 by default in the case of a malfunction. The opening of the switches I22 and I32 must be actively commanded by the command circuit, in order to apply the voltage of each module between its respective poles, and to connect said module in series to another module.

In the configuration illustrated, in the absence of a malfunction in modules Mod2 and Mod3, the latter will be connected in series by the closure of the switches I21 and I31 and the opening of the switches I22 and I32.

The converter 32 comprises an inductance 323, connected between a connecting node and the pole P1. A normally open switch I11 is connected between the cathode of module Mod1 and the connecting node. A normally closed switch I12 is connected between the anode of module Mod1 and the connecting node. The switches I11 and I12 are controlled by the command circuit, which is not illustrated. A diode 324 is connected between the pole P1 and the anode of module Mod1 (connected to the pole P2). A capacitor 327 is advantageously connected in parallel to the diode 324. The capacitor 327 permits filtering of the output voltage of the converter 32. The diode 324 permits the prevention of the occurrence of a strong negative voltage due to the battery 4. The dimensions of the capacitor 327 may therefore be determined exclusively as a function of the output voltage of the converter 32.

The command circuit defines a cyclical closing ratio $\alpha$ for the switch I11. The command circuit defines a cyclical closing ratio for the switch I12 of $(1-\alpha)$. In a manner known per se, the command circuit maintains the switch I11 open and the switch I12 simultaneously closed, and vice versa.

By the use of modules Mod1, Mod2 and Mod3 of the same type (same number of accumulators in series, same number of branches in parallel, same types of accumulators), transistors I11, I21 and I31 may be used, and transistors I12, I22 and I32 may be used. The switches I11, I21, I31, I12, I22 and I32 may be transistors of the MOSFET type, which may easily be configured to appropriate dimensions at a relatively modest cost. The transistors I11, I21, I31, I12, I22 and I32 may be of the nMOS type.

Considering, as an example, a system 7 incorporating eleven modules arranged in series with an adaptation device incorporating a module, whereby each module comprises 8 lithium/iron phosphate cells, each module will generate a rated voltage of 26.4 V (given a rated voltage of 3.3 V for a lithium-ion cell of the lithium/iron phosphate type), such that the rated voltage of the system is approximately 317 V. Given a minimum cell voltage of 2.5 V, the minimum voltage of the system 7 will be 240 V. The voltage difference between the system in the charged state and the discharged state will therefore be 77 V, or 2.9 times the voltage of the module incorporated in the voltage adaptation device. Accordingly, a converter of the boost type, configured for the maximum step-up of the voltage in its associated module by a factor of 4, is appropriate to offset the difference in the operating voltage. In practice, for the effective use of the semi-conductor surface (used for the production of a MOSFET transistor), a step-up ratio of 4 is considered to be optimum for a boost-type converter. For a higher step-up ratio, transformer-based converters will be preferred.

Available electromechanical DC circuit-breakers have a breaking capacity limited to a maximum of 100 kA. In certain system architectures of exceptionally high capacity rating, lithium-ion batteries arranged in parallel may generate a substantially higher short-circuit current, as a result of their very low internal resistance.

Accordingly, it is essential that the short-circuit current in the battery should be maintained below values which are acceptable for the circuit-breaker arranged in series with the battery, in order to guarantee the secure opening thereof. Moreover, the short-circuit current must be sufficient to ensure relatively rapid opening, in order to protect the various components whilst maintaining selectivity on the electricity distribution system.

Where the electric load comprises in fact a distribution system which is composed of a tree network with a number of circuit-breakers of different current ratings, the management of different rated current levels will render the respective dimensions of the circuit-breakers a particularly delicate issue. In order to ensure continuity of service, only the circuit-breaker associated with a defective part of the system should open. The upstream circuit-breaker should not open in order to working continuity those parts of the installation which are not in default.

Figure 13:
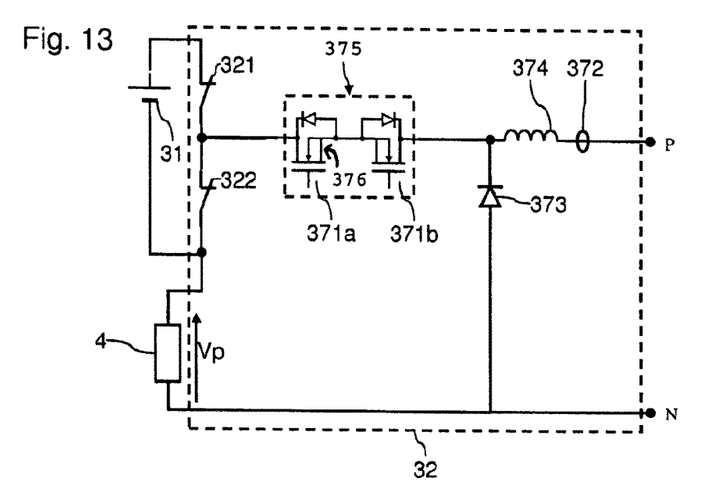
FIG. 13 shows a schematic representation of a further variant of the first form of embodiment of the converter.

FIGS. 12 and 13 illustrate variants of the first mode of embodiment, which are intended to resolve this issue. In these variants, the converter 32 still incorporates the two switches 321 and 322 connected in series (preferably switches of the normally open type), controlled by the command circuit, and typically incorporating MOS transistors. The converter 32 also incorporates the terminals of the accumulator 31 connected to the connecting node between the switches 321 and 322. As in the case of the converter illustrated in FIG. 3, the output voltage delivered by the converter is defined by the cyclical closing ratio α of the switch 321.

FIG. 11 illustrates an example of the structure for the switches 321 and 322. The switches 321 and 322 each comprise a transistor 381 (in this case, a MOSFET transistor, the parallel parasitic diode of which is identified by reference number 382).

In the example shown in FIG. 12, the converter 32 comprises an inductance 374 connected between the connecting node and the output terminal P by means of a controlled switch 376 (preferably a switch of the normally closed type). The controlled switch 376 is comprised firstly of a transistor 371 (in this case, a bipolar transistor or an IGBT) and of a diode 370, in a reverse parallel connection. The dimensions of the inductance 374 is such that the latter will not be saturated upon exposure to a short-circuit current, or will be subject to slight saturation, with one value for the regulation of a current of low intensity and a further value for the short-circuit intensity, once slight saturation has been achieved.

The converter 32 incorporates a freewheeling diode 373, the anode of which is connected to the output terminal N, and the cathode of which is connected to a node which connects the inductance 374 and the switch 376. The converter 32 also incorporates a current probe 372 for the measurement of the current flowing in the switch 376 or in the inductance 374.

Under nominal conditions, the switch 376 will remain closed, and operation will thus be identical to that described for the converter 32 in FIG. 3. The dimensions of the switches 321 and 322 will remain unchanged, as the voltage at the terminals of these switches will correspond to the voltage of the accumulator 31 only.

Under short-circuit conditions, the command circuit will detect the rise in current by means of the probe 372. The command circuit will then switch over to short-circuit mode. The command circuit will thus control the transistor 371 by pulse-width modulation, in order to regulate the current delivered to the terminal P. During the opening phases of the transistor 371, the freewheeling diode 373 will be conductive. The current flowing in the circuit-breaker 375 will, for example, be maintained by the command circuit at a level which is lower than the breaking capacity of the circuit-breaker 375. The structure of a switch 376 of this type used for the deployment of the short-circuit current limitation function is particularly straightforward, and only requires that the dimensions of the diode 373 and the switch 376 be sufficient to accommodate the potential difference between the terminals P and N.

A converter 32 of this type deploys this function with relatively limited dissipation losses. Firstly, losses in the low-voltage switches 321 and 322 are relatively low. Secondly, losses in the switch 376 are relatively low under nominal conditions, where the latter is permanently closed and the freewheeling diode 373 is in the non-conductive state.

An example may be considered for the calculation of losses in a practical case under nominal conditions. At the outset, a primary source 4 of the 400 V-40 kW type (and accordingly of rated current 100 A) is assumed. The primary source 4 comprises around ten 4 kW modules connected in series. One 4 kW module is used as an accumulator 31. Based upon the estimated efficiency of a converter 32 of a rating of 4 kW of the order of 90%, losses in the converter 32 will be of the order of 400 W. In this case, the switch 376 incorporates an IGBT, in place of the transistor 371 and the diode 370. Losses in the switch 376 under nominal conditions would be of the order of 200 W (typically 2 V at 100 A in the case of an IGBT). Losses under nominal conditions would therefore be 600 W.

For comparison, the efficiency of a converter from the prior art of rating 40 kW may be estimated at 95%, equating to losses of 2 kW.

The selection of the switch 376 may be advantageously governed by the rated current level of the primary source 4, specifically on the grounds that, for a primary source which is not required to deliver a high capacity, the use of an over-dimensioned MOSFET transistor may be preferable to the use of an IGBT, which shows a virtually constant voltage drop.

A converter 32 of this type also provides the option for the pre-charging of capacitors in an inverter which is connected to the terminals P and N, using the switch 376 and the freewheeling diode 373 in switching mode during a pre-charging phase.

In the example shown in FIGS. 11 and 12, the diodes 370 and 382 are oriented in the same direction.

The variant illustrated in FIG. 13 permits the blocking of a current which may originate from the terminals P and N, for example a charging current originating from a charger. To this end, the switch 376 in this case incorporates two transistors 371a and 371b, arranged head-to-tail in series (in this case, MOSFET transistors), with internal diodes in a reverse parallel arrangement. The transistor 371b permits the blocking of the current between primary sources 4, in the presence of any such voltage difference. However, this additional security function is associated with higher losses under nominal conditions. A switch 376 of this type may be advantageously used for the selective retrieval of energy of the electric load to be delivered to the primary source(s) 4.

Figure 14:
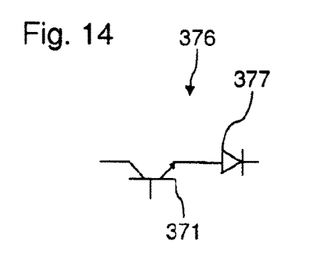
FIG. 14 illustrates a further example of a switch.
Figure 15:
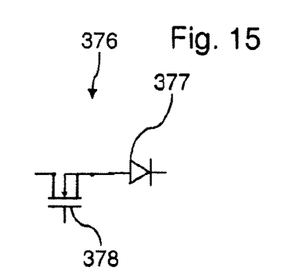
FIG. 15 illustrates another further example of a switch.

FIGS. 14 and 15 illustrate two simplified variants of the switch 376 in FIG. 13. In the example illustrated in FIG. 14, the transistor 371*b* is replaced by a diode 377, and the transistor 371*a* is replaced by a bipolar transistor or an IGBT 371. In the example illustrated in FIG. 15, the transistor 371*b* is replaced by a diode 377, and the transistor 378 is identical to the transistor 371*a*. These variants do not permit the recharging of the primary sources 4 from the electric load, but are of simplified structure.

Figure 16:
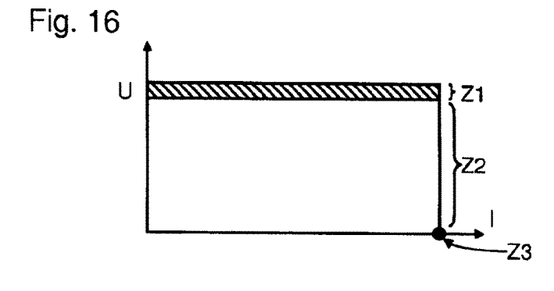
FIG. 16 shows a voltage/current diagram, considered from the point of the electric load.

FIG. 16 shows a schematic voltage/current diagram for the operation of a converter, as described with reference to FIGS. 12 and 13, considered from the point of the electric load supplied. A first operating zone Z1 corresponds to the nominal operation of the primary source 4. The switches 321 and 322 are then controlled by pulse-width modulation, and the switch 376 is maintained in the closed position. A second operating zone Z2 corresponds to transient conditions of constant current, whereby the voltage is variable for the charging for example of the capacitors in an inverter which is connected between the terminals P and N. The switch 376 is then controlled by pulse-width modulation. A third operating zone Z3 corresponds to short-circuit conditions, in which the voltage is virtually zero and the discharge current is limited, whereby the switch 376 is then controlled by pulse-width modulation.

Although the invention has been described with electrochemical cells of the electrochemical accumulator type, the invention may also be applied to other electrochemical cells, such as cells of the fuel cell type.

The invention claimed is:

1. An apparatus comprising a DC voltage power source, wherein said DC voltage power source comprises first and second output terminals, first electrochemical cells, a DC-DC converter, and a secondary DC-voltage source, wherein said first electrochemical cells are electrically connected in series, thereby defining a series connection having a first potential difference, wherein said DC/DC converter defines a second potential difference across an output interface thereof, wherein said series connection of said first electrochemical cells is connected in series with said DC/DC converter, wherein a non-zero potential difference across said output terminals is equal to a sum of said first potential difference and said second potential difference, and wherein said secondary DC-voltage source applies a third potential difference across an input interface of said DC/DC converter.

2. The apparatus of claim 1, wherein said first potential difference is between 4 and 20 times greater than the third potential difference.

3. The apparatus of claim 1, wherein said secondary DC voltage source incorporates a second electrochemical cell of the same type as the first electrochemical cells.

4. The apparatus of claim 3, wherein said DC/DC converter comprises a step-down voltage converter while discharging said second electrochemical cell.

5. The apparatus of claim 4, wherein said step-down voltage converter comprises a step-down voltage switching circuit comprising first and second switches that are connected to each other at a node, wherein said first and second switches are controlled switches, wherein said third potential difference is applied across said first and second switches, wherein said first and second switches each comprise a freewheeling diode, wherein said DC/DC converter further comprises a current-limiting command circuit, an inductance, a freewheeling diode, and a third switch, wherein said third switch comprises a first switch-terminal and a second switch-terminal, wherein said current-limiting command circuit controls said third switch, wherein said first switch-terminal connects to a connecting node between said first and second switches, wherein said freewheeling diode is connected between said first output terminal and said second switch-terminal, and wherein said inductance connects between said second switch-terminal and said second output terminal.

6. The apparatus of claim 5, wherein said third switch comprises two transistors arranged head-to-tail in series between said connecting node and the inductance.

7. The apparatus of claim 1, wherein said first potential difference exceeds 100 V.

8. The apparatus of claim 1, wherein said third potential difference is lower than 100 V.

9. The apparatus of claim 1, wherein said DC/DC converter comprises a galvanic isolation transformer that has a primary side connected to said secondary DC-voltage source and a secondary side connected to said first electrochemical cells.

10. The apparatus of claim 1, wherein said first electrochemical cells comprise electrochemical accumulators.

11. The apparatus of claim 10, further comprising a plurality of batteries connected in series, wherein each battery comprises a number of said first electrochemical accumulators connected in series, wherein each battery comprises first and second power output poles, wherein said DC voltage source comprises safety devices and a command circuit, wherein each safety device is associated with one battery from said plurality of devices, wherein each safety device comprises first and second switches and first and second branches, wherein said first switch is normally open and said second switch is normally closed, wherein a supply voltage of said battery is applied as a command signal for the default closure of the second switch, wherein said first and second branches are connected in parallel between the first and second power output poles of the battery, wherein the first branch incorporates said battery and said first switch connected in series, and wherein said second switch selectively opens and closes the second branch, and wherein said command circuit determines a voltage level to be supplied by the DC voltage source, determines a set of safety devices to be activated for the delivery of the voltage level thus determined, and effects override closure of the first switches and the override opening of the second switches in the safety devices that belong to said set.

12. The apparatus of claim 1, further comprising a command circuit that is connected to said DC/DC converter and that is configured for the application, to the DC/DC converter, of a setpoint signal for the potential difference thereof on the output interface.

13. The apparatus of claim 12, wherein said DC/DC converter comprises first and second switches and an inductance, all of which are connected to a connecting node between the first and second switches, wherein said command circuit is configured for the opening the first switch and closing the second switch with a cyclical ratio that defines the output voltage of the DC/DC converter.

14. The apparatus of claim 1, further comprising a monitoring circuit and contactors, wherein said secondary DC voltage source is one of a plurality of identical DC voltage sources, wherein said identical DC voltage sources are connected in parallel by said contactor, wherein said monitoring circuit is configured for the delivery of the same setpoint voltage to each of said identical DC voltage sources and for opening and closing said contactors.

15. The apparatus of claim 4, further comprising a circuit-breaker, wherein said circuit-breaker is connected in series with an inductance between said two output terminals, wherein a switch controlled by a current-limiting command circuit is controlled so as to limit the current flowing in the circuit-breaker to a value that is lower than a breaking capacity of the circuit-breaker.

16. The apparatus of claim 5, wherein said third switch comprises a control terminal that controls current flow between said first and second switch-terminals, wherein said current-limiting command circuit controls said third switch through said control terminal.

17. The apparatus of claim 3, wherein said DC/DC converter comprises a step-down voltage converter while discharging said second electrochemical cell and a step-up voltage converter while charging said second electrochemical cell.

18. The apparatus of claim 1, wherein said first potential difference is greater than said third potential difference.

* * * * *